US006778072B2

(12) United States Patent
Phillips et al.

(10) Patent No.: US 6,778,072 B2
(45) Date of Patent: Aug. 17, 2004

(54) METHOD AND APPARATUS FOR OPERATING A VEHICLE SAFETY ARM

(75) Inventors: William R. Phillips, Belleville (CA); James A. Reavell, Campbellford (CA)

(73) Assignee: B.M.R. Mfg. Inc., Campbellford (CA)

( * ) Notice: Subject to any disclaimer, the term of this patent is extended or adjusted under 35 U.S.C. 154(b) by 0 days.

(21) Appl. No.: 10/262,664

(22) Filed: Oct. 2, 2002

(65) Prior Publication Data

US 2003/0061982 A1 Apr. 3, 2003

(30) Foreign Application Priority Data

Oct. 3, 2001 (CA) .............................................. 2358181

(51) Int. Cl.[7] .................................................. B60Q 1/26
(52) U.S. Cl. .................... 340/433; 340/425.5; 340/468; 180/271; 180/281; 280/764.1
(58) Field of Search .............................. 340/433, 425.5, 340/426.23, 463, 468, 471; 180/271, 274, 281, 289; 40/591; 280/763.1, 764.1; 116/28 R (56) References Cited

U.S. PATENT DOCUMENTS

| 4,766,413 A | 8/1988 | Reavell ....................... 340/130 |
| 4,816,804 A | 3/1989 | Reavell ....................... 340/433 |
| 4,956,630 A | 9/1990 | Wicker ....................... 340/433 |
| 4,983,949 A | 1/1991 | Wicker ....................... 340/433 |
| 5,036,307 A | 7/1991 | Reavell et al. .............. 340/487 |
| 5,050,430 A | 9/1991 | Begin et al. .................. 73/292 |
| 5,132,662 A | 7/1992 | Burch ....................... 340/433 |
| 5,281,948 A * | 1/1994 | Estrada ....................... 340/433 |
| 5,357,239 A | 10/1994 | Lamparter ................... 340/433 |
| 5,406,250 A | 4/1995 | Reavell et al. .............. 340/433 |
| 5,564,359 A * | 10/1996 | Harder ....................... 116/28 R |
| 5,719,553 A | 2/1998 | Lamparter ................... 340/433 |
| 5,783,924 A | 7/1998 | Kahlman ..................... 318/601 |
| 5,812,052 A | 9/1998 | Swanger et al. ............. 340/433 |
| 5,939,961 A | 8/1999 | Fevre ......................... 335/205 |
| 6,009,650 A * | 1/2000 | Lamparter ................... 40/572 |
| 6,222,362 B1 | 4/2001 | Schulter et al. ........ 324/207.25 |
| 6,396,395 B1 * | 5/2002 | Zielinski et al. ......... 340/425.5 |

* cited by examiner

Primary Examiner—Toan N. Pham
(74) Attorney, Agent, or Firm—Dimock Stratton LLP; Mark B. Eisen (57) ABSTRACT

An apparatus for operating a reciprocating arm vehicular safety device with a lock for preventing inadvertent deployment of the reciprocating arm. The apparatus has a rotor provided with retaining fingers for engaging the reciprocating, rotatable between locked and unlocked positions. When the reciprocating arm is retracted the rotor rotates to the locked position, and drive circuitry deactivates the device in response to stalling of the rotor drive motor.

20 Claims, 5 Drawing Sheets

METHOD AND APPARATUS FOR OPERATING A VEHICLE SAFETY ARM

FIELD OF THE INVENTION

This invention relates to safety devices. In particular, this invention relates to a method and apparatus for deploying and retracting vehicle safety devices such as stop signs and crossing gates.

BACKGROUND OF THE INVENTION

Vehicles such as school buses serve to pick up and discharge passengers. When passengers are discharged from the front door of the bus to the side of a road, the passengers may attempt to cross the road immediately in front of the bus. This poses a safety risk, particularly with school-age children, as the road immediately in front of the bus may be in the bus driver's blind spot, i.e. outside the bus driver's range of vision. Accordingly, safety measures such as crossing gates mounted on the front of the bus have been employed for many years. An example is shown in U.S. Pat. No. 5,406,250 issued Apr. 11, 1995 to Reavell et al., which is incorporated herein by reference.

These crossing gates are typically hinged to the front of the bus at the side nearest the front door. In the retracted state, the crossing gate is held parallel to the front of the bus. When the bus stops and the front door is opened, the crossing gate is extended until it is substantially perpendicular to the front of the bus, effectively providing a barrier at the side of the road of typically at least one meter. Discharged passengers who wish to cross the road must walk around the crossing gate, causing them to pass through the driver's range of vision. After the passengers have passed beyond the front of the bus, the crossing gate is retracted.

An example of a prior art retraction mechanism is U.S. Pat. No. 4,816,804 issued Mar. 28, 1989 to Reavell, which is incorporated herein by reference. The apparatus controlling the safety device, in the case of U.S. Pat. No. 4,816,804 a school bus stop sign, is automatically responsive to the opening and closing of the bus door such that when the door is opened, the apparatus swings the hinged sign to its extended position, and when the door is closed, the apparatus returns the sign to its retracted position. The apparatus comprises a unidirectional motor coupled to the hinged sign through an eccentric drive and a link arm. The link arm is provided with a preloaded, helical compression spring which absorbs the shock of mechanical leverage.

However, apparatus such as these do not prevent inadvertent deployment of the safety device. Although a compression spring in the link arm can help to prevent excessive forces from damaging the mechanical linkages on the safety device, it is not able to prevent unintended deployment of the safety device when the device is exposed to high winds. Wind may catch the safety device, especially in the case of a gate, and partially or fully deploy the gate or even damage the device. Particularly if the bus is in motion, such accidental deployment of the gate is a significant hazard. Even when the bus is parked, the gate is more susceptible to breakage and damage from high winds when extended inadvertently.

One solution to this problem has been to employ an electromagnetic device to hold a crossing gate in the retracted position. Such an electromagnetic device would be activated while the safety device is in the retracted position, and deactivated when the safety device is to be deployed. However, an electromagnetic device can only be employed while the bus is in operation, because the power required to energize the electromagnet is supplied by the vehicle electrical system. This is not a satisfactory solution for use when the bus is not in operation and the power is shut off and parked, for example where high winds or storms strike overnight. Furthermore, the electromagnetic device cannot detect when the gate does not fully retract (for example if an obstruction becomes trapped between the gate and the vehicle body), nor can it compensate for slight misalignment or deviations in the path of retraction.

It would accordingly be advantageous to provide a device for engaging a reciprocating arm such as a safety gate, such that in the retracted position the arm is positively engaged by mechanical means. It would further be advantageous to provide such a reciprocating arm with means for monitoring the position of the arm to detect when the arm is fully retracted and the locking mechanism is properly engaged.

SUMMARY OF THE INVENTION

The present invention provides an apparatus for operating a vehicle safety device comprising a reciprocating arm, which allows the reciprocating arm to be locked in the retracted position. The reciprocating arm is mounted to a drive motor, which extends and retracts the arm, connected to a drive circuit. The locking mechanism comprises a rotor provided with at least one retaining finger defining a hook for engaging the reciprocating arm. The rotor is rotatably mounted to a drive motor in the path of retraction of the arm, and connected to the drive circuit. When the reciprocating arm has reached the retracted position, the drive circuit rotates the rotor in a locking direction, until the retaining finger engages the reciprocating arm. When the reciprocating arm is to be moved to the deployed or extended position, the drive circuit activates the rotor drive in the unlocking direction until the rotor releases the reciprocating arm, and then activates the reciprocating arm drive to deploy the arm.

The invention further provides a means for monitoring the status of engagement of the rotor, so that if the reciprocating arm is not fully retracted when the rotor drive is activated to engage the reciprocating arm, the rotor will continue to rotate in the locking direction, and the reciprocating arm continues to retract, until the rotor drive engages the arm and the circuit senses that the rotor drive has stalled.

The present invention thus provides an apparatus for operating a safety device comprising an arm having extended and retracted positions, comprising: a drive motor for moving the arm between the extended and retracted positions; and a lock for engaging the arm in the retracted position, comprising a rotor mounted in a path of retraction of the arm, having a locked position and an unlocked position, and comprising at least one retaining finger for engaging the arm in the locked position; a drive motor for rotating the rotor between the locked and unlocked positions; and a drive circuit for operating the arm drive motor and the rotor drive motor, comprising a circuit for sensing stalling of the rotor drive motor and deactivating the drive circuit in response thereto.

The present invention further provides an apparatus for operating a safety device comprising an arm having extended and retracted positions, comprising: a drive motor for moving the arm between the extended and retracted positions; and a lock for engaging the arm in the retracted position, comprising a rotor mounted in a path of retraction of the arm, having a locked position and an unlocked position, and comprising a pair of opposed retaining fingers for engaging the arm in the locked position, the retaining fingers having hooked ends for engaging over edges of the arm in the locked position, a distance between the hooked ends being greater than a height of the arm; a drive motor for rotating the rotor between the locked and unlocked positions; and a drive circuit for operating the arm drive motor and the rotor drive motor; whereby when the rotor is rotated to the unlocked position the arm can be extended through an opening between the hooked ends of the retaining fingers.

In further aspects of the apparatus of the invention: each retaining finger comprises a hooked end adapted to engage the arm; the rotor comprises two retaining fingers disposed in opposition; the arm comprises bevelled upper and lower edges; when the apparatus is in the retracted position the drive circuit periodically activates the rotor drive motor in a locking direction; to extend the arm, the arm drive motor is activated after the rotor drive motor; a stop is provided in a path of rotation of the rotor, whereby the rotor cannot rotate beyond the stop in an unlocking direction; and/or the stop comprises a slanted edge whereby the rotor can rotate beyond the stop in a locking direction.

The present invention further provides a method of operating a safety device comprising an arm having extended and retracted positions, comprising the steps of: a. moving the arm from an extended position to a retracted position; b. rotating a rotor mounted in a path of retraction of the arm, the rotor having a locked position and an unlocked position and comprising at least one retaining finger for engaging the arm in the locked position; and c. sensing stalling of the rotor and deactivating the device in response thereto.

In further aspects of the method of the invention: the rotor comprises at least one retaining finger comprising a hooked end adapted to engage the arm and stall the rotor drive motor; the rotor comprises two retaining fingers disposed in opposition; and/or the method comprises the additional step of, when the apparatus is in the retracted position, periodically activating the rotor drive motor in a locking direction.

BRIEF DESCRIPTION OF THE DRAWINGS

In drawings which illustrate by way of example only a preferred embodiment of the invention.

DETAILED DESCRIPTION OF THE INVENTION

Figure 1:
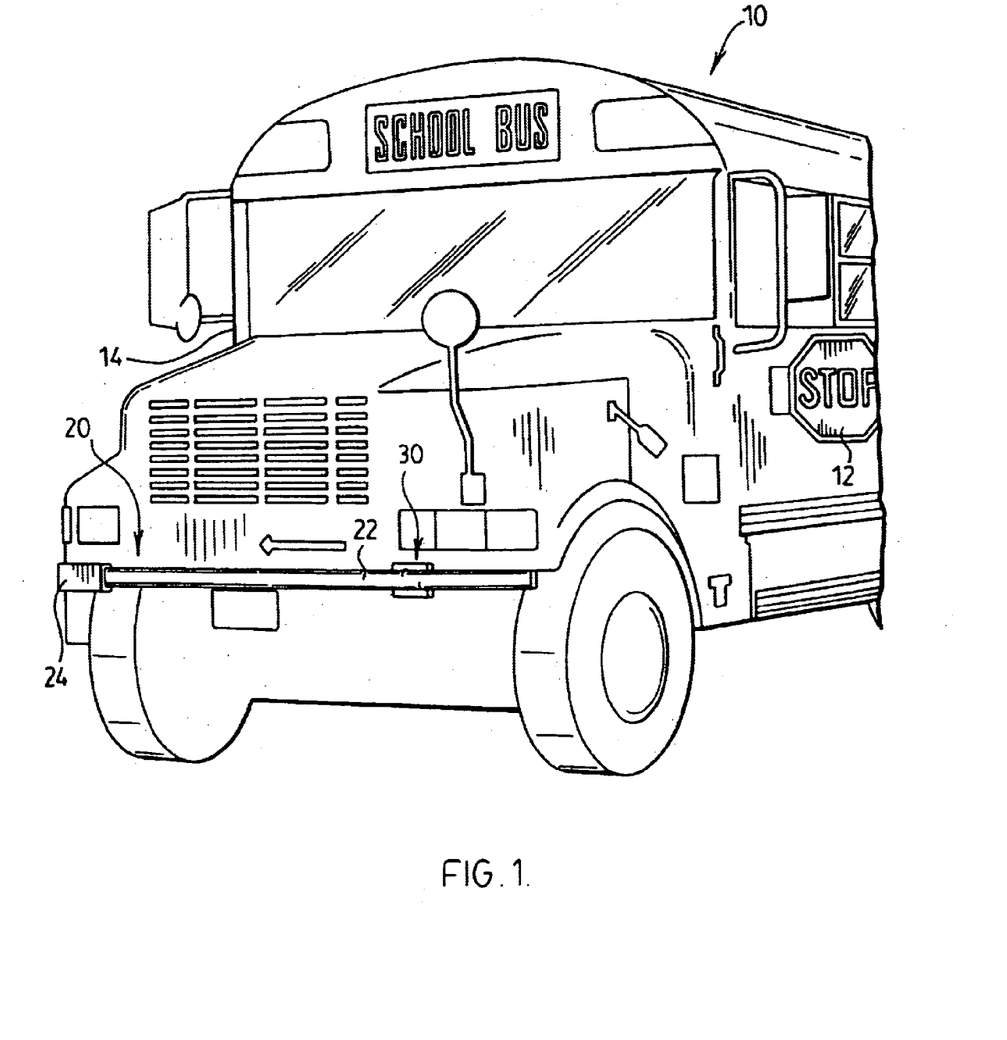
FIG. 1 is a perspective view illustrating the reciprocating arm of the invention mounted to the front of a school bus.

FIG. 1 illustrates a typical school bus 10, having safety devices in the nature of a stop sign 12, and a crossing gate 20 mounted on the front of the bus 10, typically to the front bumper 16. Both of these safety devices deploy to the extended position when the front door 14 of the bus 10 is opened to take on or discharge passengers. When the front door 14 of the bus 10 is closed, the stop sign 12 and crossing gate 20 are returned to the retracted position. The invention will be described in the context of the crossing gate 20, however it will be appreciated that the invention can be applied to other reciprocating or retractable devices and the invention is not limited in this regard.

The crossing gate 20 is mounted to the front of the bus 10 near the door 14. The arm 22 of the crossing gate 20 is sufficiently long that, when extended, it creates a barrier which effectively prevents discharged passengers from walking through the driver's blind spot immediately in front of the bus 10. The gate 20 is mounted to a gate drive motor 24 that deploys and retracts the arm 22, which is typically housed in a sealed housing that in turn is mounted to the exterior of the bus. One suitable mechanism for deploying and retracting a crossing gate of this type, by way of example only, is described in U.S. Pat. No. 5,406,250 issued Apr. 11, 1995 to Reavell et al, which is incorporated herein by reference. FIG. 1 illustrates the retracted position of the gate 20 in solid lines and the extended or deployed position of the gate 20 in phantom lines.

Figure 2:
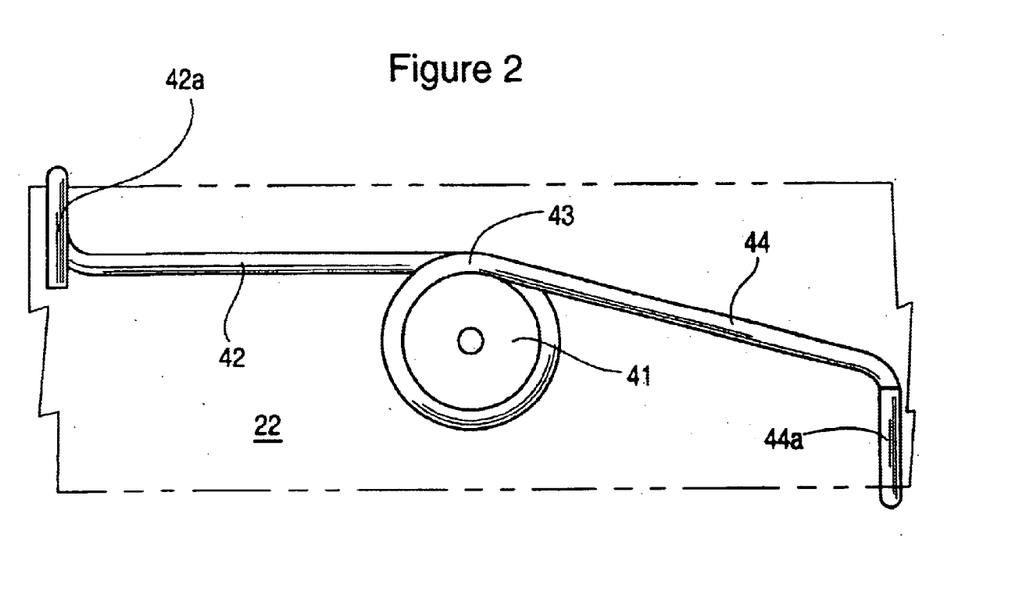
FIG. 2 is a front elevation showing the locking mechanism in the locked position.
Figure 3:
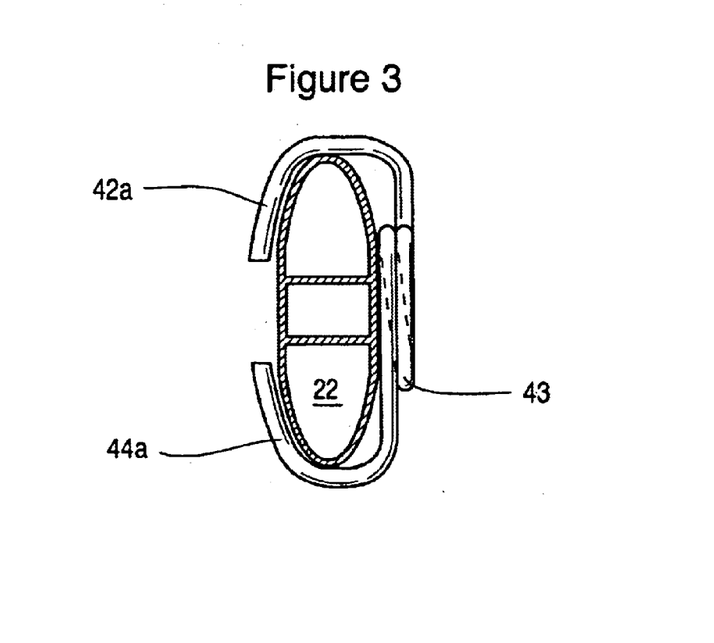
FIG. 3 is an end elevation showing the locking mechanism in the locked position.
Figure 4:
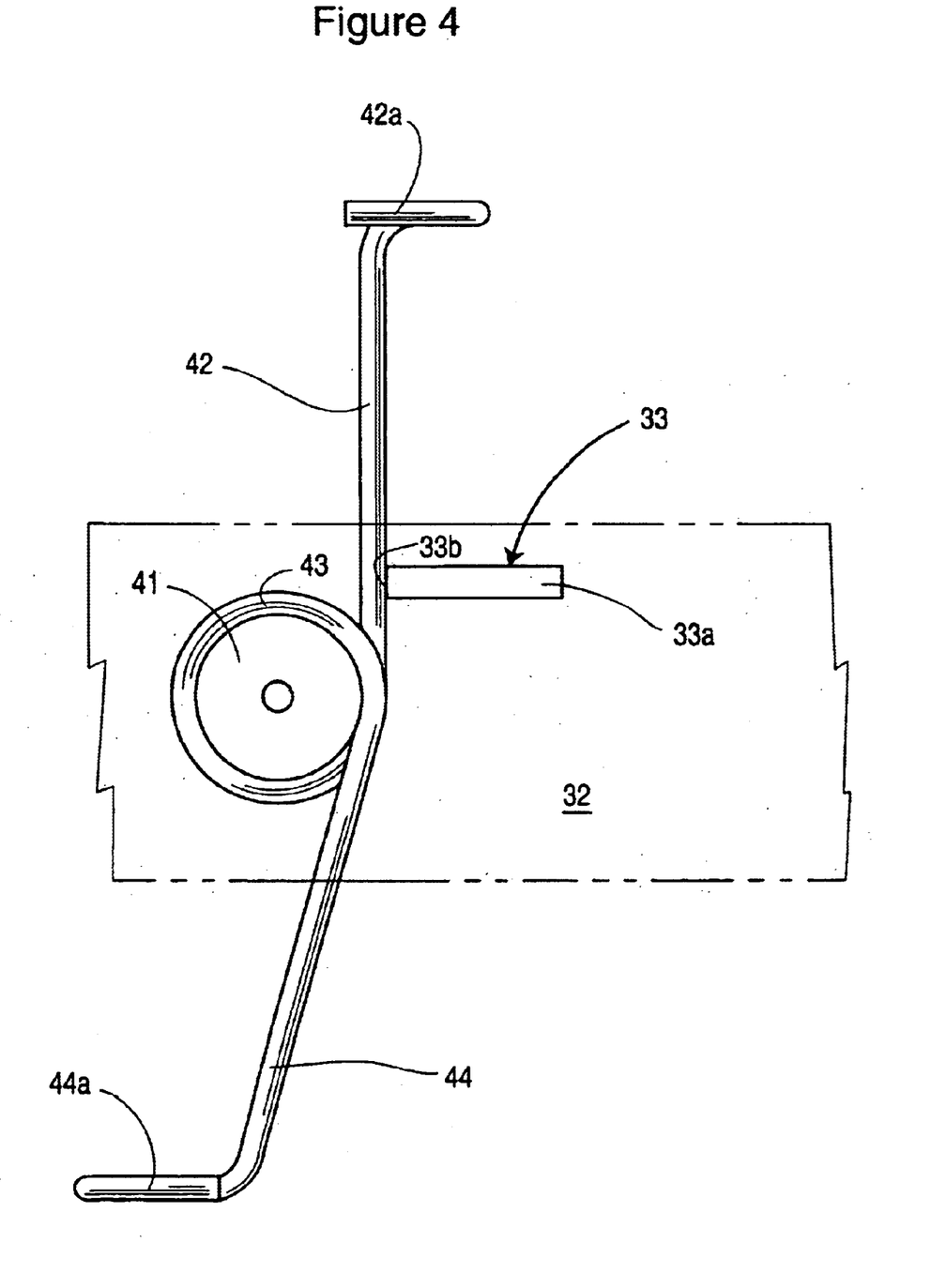
FIG. 4 is a front elevation showing the locking mechanism in the unlocked position.

The invention comprises a novel gate lock 30 for engaging and supporting the arm 22 in the retracted position, illustrated in FIGS. 2 to 5. The gate lock 30 comprises a rotor 40 having at least one retaining finger, and preferably two retaining fingers 42, 44 disposed in opposition about a hub 41. The retaining fingers 42, 44 are preferably formed integrally from a single piece of resilient material, such as ⅛" spring steel wire, with a central loop 43 which engages around a hub 41. Each retaining finger 42, 44 respectively comprises a hooked end 42a, 44a dimensioned to engage over the top and bottom edges, respectively, of the gate arm 22, as best seen in FIG. 3. The hooked ends 42a, 44a of the rotor 40 are oriented forwardly of the hub 41, and the distance between the hooked ends 42a, 44a is greater than the height of the gate arm 22, so that the gate arm 22 can retract into the space between the hooked ends 42a, 44a when the gate lock 30 is in the unlocked position, as shown in FIG. 4.

Figure 5:
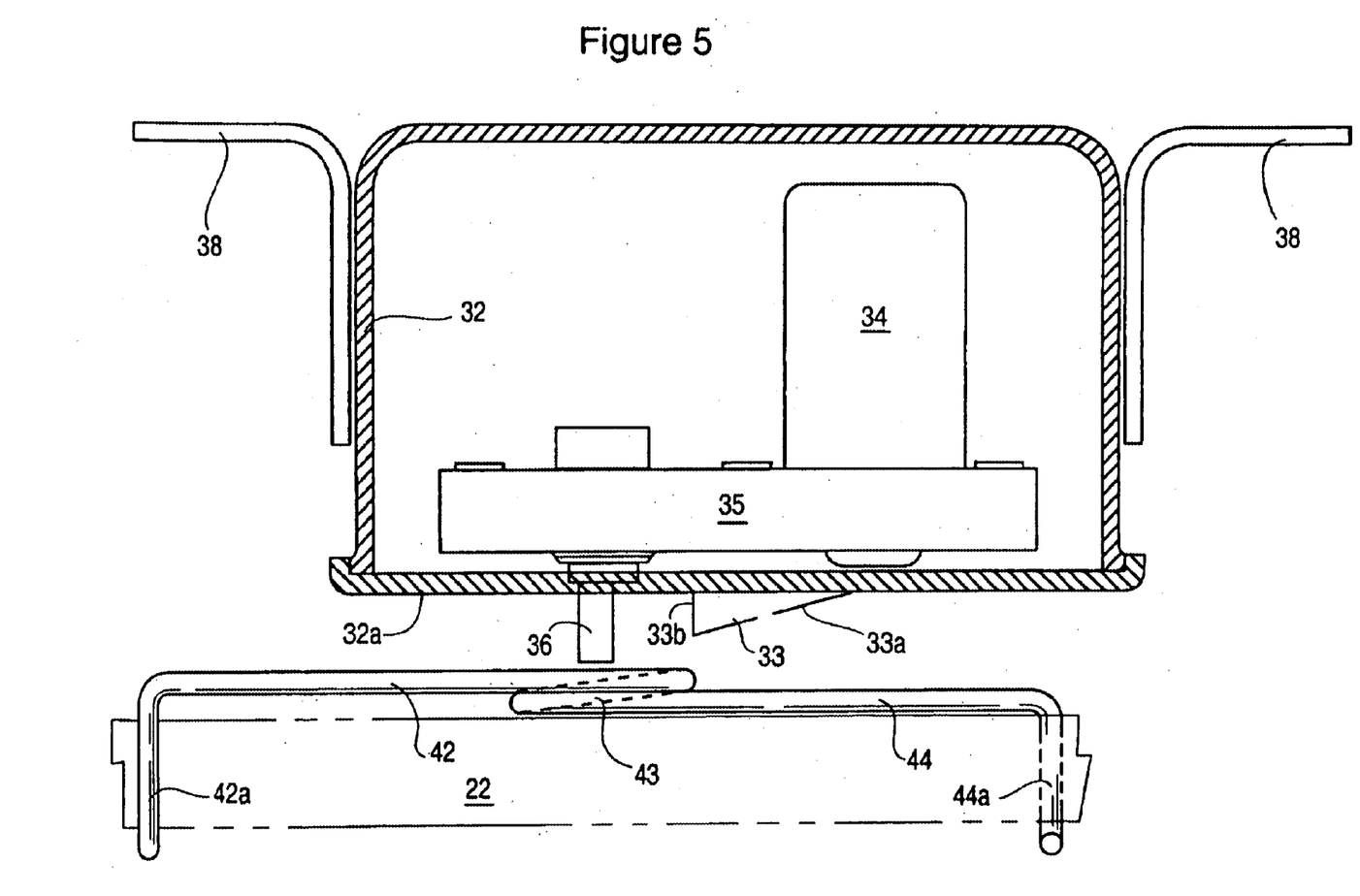
FIG. 5 is a partially exploded top cross-section showing the locking mechanism in the unlocked position.

The rotor 40 is mounted on a rotating shaft 36 which is driven by a gate lock motor 34 through transmission 35, housed in a gate lock motor housing 32 which is affixed to the exterior of the bus 10 in any suitable fashion, for example by brackets 38 welded or otherwise attached to the housing 32, and at any suitable position. The shaft 36 extends through a front face 32a of the housing 32, which is preferably removable for servicing the motor 34 and transmission 35.

When the rotor 40 is mounted to the shaft 36, the retaining fingers 42, 44 extend radially outwardly from the hub 41. A channel is formed between the hooked ends 42a, 44a of the retaining fingers 42, 44 having a sufficient breadth to receive the gate arm 22 when the gate lock 30 is in the unlocked position (i.e. the retaining fingers 42, 44 are substantially offset from the horizontal orientation), and the hooked ends 42a, 44a protrude forwardly of the hub 41 so that the fingers 42, 44 can engage the gate arm 22 when the gate lock 30 is in the locked position (i.e. the retaining fingers 42, 44 are in a substantially horizontal orientation). The gate lock motor 34 drives the gate lock 30 rotationally between the locked and unlocked positions, in the manner described below.

Thus, in the unlocked position shown in FIG. 4, the hooked ends 42a, 44a of the fingers 42, 44 are clear of the gate arm 22 and provide an opening in the direction of extension of the gate 20, to thereby allow deployment and retraction of the gate 20. In the locked position, shown in FIGS. 2 and 3, the hooked ends 42a, 44a of the fingers 42, 44 respectively engage the top and bottom edges of the gate arm 22, thus restraining the gate 20 from moving from the retracted to the deployed position.

Preferably the front face 32a of the gate motor housing 32 is provided with a stop 33 having a sloped edge 33a and a stop edge 33b, positioned in relation to the rotor 40 such that when the gate lock 30 is rotating in the unlocking direction (clockwise in the embodiment shown) one of the retaining fingers 42, 44 (the retaining finger 42 in the embodiment shown) contacts the stop edge 32b to prevent rotation beyond a certain point, preferably the point where the rotor 40 is oriented substantially vertically but at least at a point where the hooked ends 42a, 44a of the fingers 42, 44 disengage from the gate arm 22. When the gate lock 30 is rotating in the locking direction and the retaining finger 42 contacts the stop 33 (i.e. where the gate arm 22 is not fully retracted), the retaining finger 42 will glide over the sloped edge 33a of the stop 33, flexing forwardly as it ramps up the incline, until the finger 42 passes over the stop 33, which allows the rotor 40 to complete a full revolution if the gate arm 22 is not fully retracted.

In an alternative embodiment, a spring loaded one-way trip wire (not shown) may be provided on the front face 32a of the housing 32 to provide a stop for the arm 22 in the unlocking direction (but not in the locking direction), which will avoid wearing of the rotor 40 as it ramps over the stop 33. In a further alternative embodiment, the stop 33 can be omitted entirely and the rotor 40 can be allowed to rotate in the unlocking direction throughout the interval that the gate arm 22 is extended, with the gate drive motor 34 reversing its direction when retraction of the gate arm 22 commences.

Figure 6:
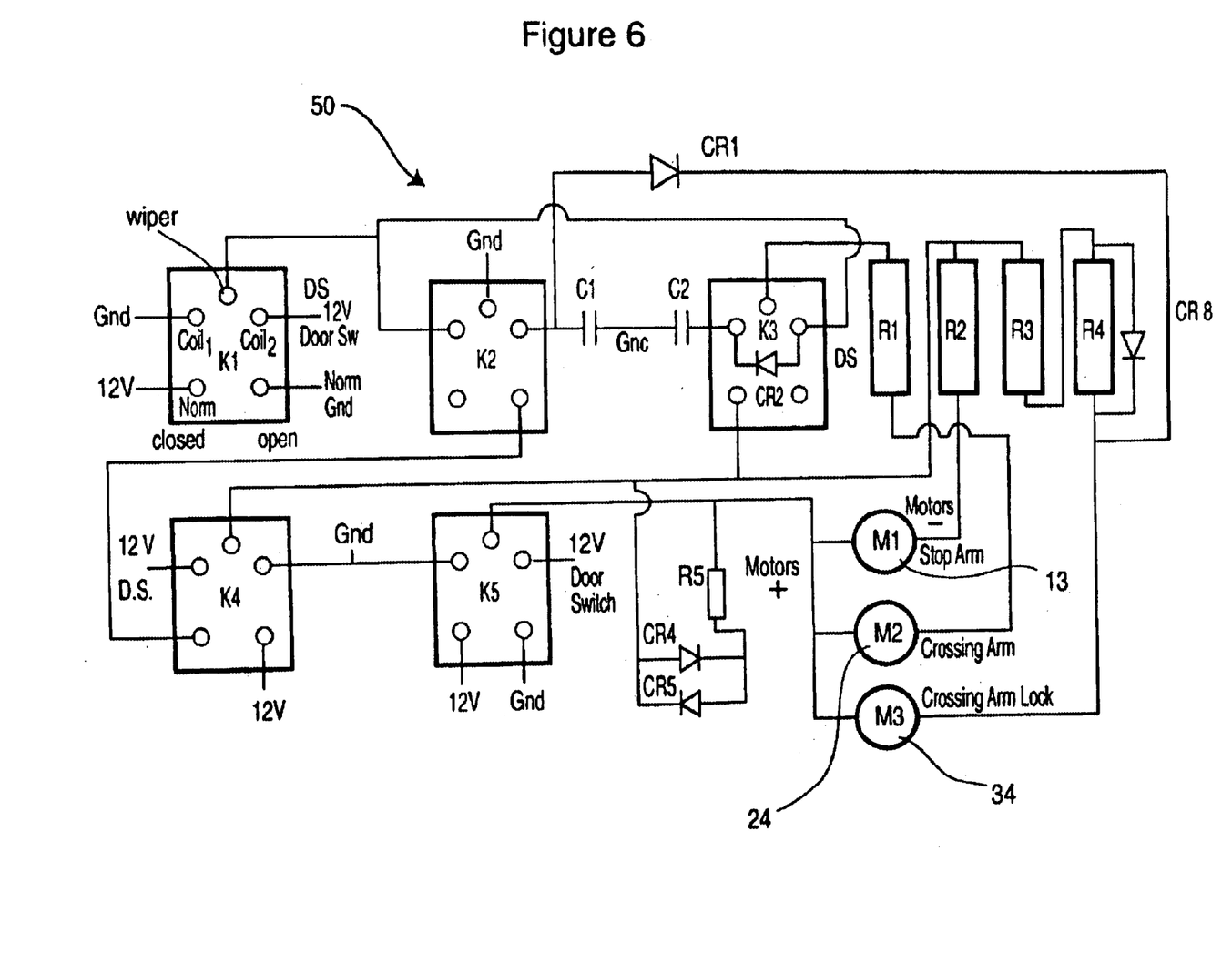
FIG. 6 is a schematic diagram showing the drive circuit.

Preferably, the gate drive motor 24 and the gate lock motor 34 are controlled using a common electrical source, for example the vehicle generator (not shown), and are coupled to a common drive circuit 50, illustrated in FIG. 6. The stop sign 12 may also be activated by the same drive circuit 50, via motor 13. In one preferred embodiment of the drive circuit 50: C1 C2 are capacitors, 2400 micro farad 16 volt; CR1, CR2, CR3 are diodes, 1N540; CR4 and CR5 are red and green LEDs, respectively; K1, K2, K3, K4, K5 are relays, single pole double throw 12 volt coil, having wipers W, normally open contacts NO and normally closed contacts NC; M1 M2 M3 are motors, 12 volt; R1, R2, R3 are resistors, 10 ohm 10 watt; R4 is a resistor, 5 ohm 10 watt; and R5 is a resistor, 1000 ohm ¼ watt.

The drive circuit 50 operates as follows: In the quiescent state all relays are relaxed. No current is flowing in the drive circuit 50 or the motors 13, 24, 34. When the door 12 is opened, the control signal 12 volt door switch DS goes to 12 volts, relay K1 is picked and held, and K1W goes to 12 volts. C1 is charged to 12 volts via the path K1NO, K1W, K2C1, K2C2 and C1. K3 is picked via the path K1NO, K1W, K3C2, K3C1 and C2. When C2 charges, K3 drops out. K4 and K5 are picked and held. A 12 volt signal is applied to the common side of the 3 motors 13, 24, 34. Ground is applied to the other side of the motor 13 via R2; and motor 34 via R3 and CR3. CR5 illuminates to indicate to the driver that the crossing gate 20 and stop sign 12 are being deployed.

When K3 drops out ground is applied to motor 24 via K3NC, K3W and R1. Motors 13 and 34 immediately rotate at full speed. Motor 24 is delayed until K3 drops out, after which it rotates at full speed. All motors 13, 24, 34 rotate to the forward stops: the full extension position in the case of gate drive motor 24 and stop sign drive motor 13; and the finger 42 abutting stop edge 33b in the case of rotor drive motor 34. All motors 13, 24, 34 stall at the forward stops, with R1, R2 and R3 limiting the current flow thru the motors 13, 24, 34.

When the door 12 is closed by the driver, the 12volt signal is removed from the door switch DS. K1, K2 and K5 drop out, and K1W goes to ground. C1 discharges and picks K2. C2 discharges thru CR2 and does not pick K3. K5W applies 12 volts to the common side of motors 13, 24, 34. Ground is applied to motor 13 via the path K2W, K2NO, K4NC, K4W and R2; to motor 24 via the path K2W, K2NO, K4NC, K4W K3NC, K3W and R1; and to motor 34 via the path K2W, K2NO, K4NC, K4W, R3 and R4. CR4 illuminates to indicate to the driver that the stop sign 12 and gate 20 are retracting. All motors 13, 24, 34 rotate in the reverse direction. Motor 34 rotates at reduced speed because CR3 is back biased and current must flow thru R4, so the crossing gate 20 retracts slowly. As motor 34 is freely rotating it shows a high back EMF to the drive voltage, therefore the junction R4 and motor 34 is at a low voltage. This potential is fed onto the K2C2 via CR1 and holds K2 activated.

Motors 13 and 24 rotate at full reverse speed, and encounter their reverse stops (the fully retracted position of the stop sign 12 in the case of motor 13, and the fully retracted position of the gate arm 22 in the case of motor 24), where they stall. As motor 34 reaches its reverse stop (engagement with the gate arm 22) and stalls, the resistance of motor 34 decreases. Less voltage is applied across motor 34 and the voltage at junction R4 and motor 34 increases. The increase in voltage is sensed at C2 via CR1 and balances the 12 v sensed at C1 via K1W and K1NC. K2 drops out, so K2NO goes to floating potential and current flow ceases thru the motors. The indicator CR4 goes out to indicate to the driver that retraction is complete, and the circuit is returned to quiescent state.

Thus, under control of a 12 volt signal, all three motors 13, 24, 34 rotate until physical forward stops are encountered. When the control signal is negated, all three motors 13, 24, 34 rotate in the reverse direction until physical reverse stops are encountered. Upon the crossing gate drive motor 34 reaching its fully retracted position, the voltage is removed from the motors 13, 24, 34. No limit switches or position sensing devices are required, and only the current draw of the stalled crossing gate drive motor 34 is monitored.

If the gate arm 22 is not fully retracted when the gate drive motor 24 stalls, for example if the gate arm 22 is obstructed and prevented from fully retracting, the gate arm 22 is not in position to block rotation of the gate lock drive motor 34 and stall the gate lock drive motor 34, so the gate lock 30 will continue to rotate in the locking direction and CR4 will remain illuminated. The gate drive motor 24 thus continues to force the gate 20 in the retraction direction. All three motors 13, 24, 34 thus continue to operate until the gate lock 30 is securely in position engaging the gate arm 22. This ensures that the driver does not falsely assume the gate is properly retracted and locked merely because the gate lock is indicated as being in the locked position. It will be noted that the top and bottom edges of the gate arm 22 are preferably bevelled, as shown in FIG. 3, so if the gate arm 22 is only slightly shy of the fully retracted position the hooked ends 42a, 44a will strike the edges of the gate arm 22 and cam down the bevelled edges of the gate arm 22 to draw the gate arm 22 to the fully retracted position.

In the preferred embodiment, only the gate lock motor 34 and the gate motor 24 are located in housings mounted on the exterior of the bus; the drive circuit 50 is housed within the cabin of the vehicle 10. Optionally the drive circuit 50 may provide further LEDs to indicate the state of the safety device; for example, for the gate lock 30, a green LED to indicate when the gate lock 30 is in the locked state and a red LED to indicate when the gate lock 30 is in the unlocked state; and for the crossing gate 20 itself, a green LED to indicate when the gate arm 22 is retracted, and a red LED to indicate when the gate arm 22 is extended.

A breakaway link assembly such as that described in U.S. Pat. No. 4,816,804 issued to Reavell, which is incorporated herein by reference, may be used in the safety device to sense external pressure on the gate arm 22. When external force is applied to the gate arm 22 in either the deployed or retracted positions, for example in windy conditions, the force is transferred to the link assembly. The circuit senses the mechanical external force and checks the drive torque to avoid mechanical damage of the motor 34 or transmission 35. When the external force is removed from the gate arm 22, the circuit senses this change and the motor 34 is still connected and continues to drive the gate 20 at its maximum torque.

In operation, while the bus 10 is moving the gate arm 22 is in the retracted position and engaged by the gate lock 30, which is in the locked position with the channels engaging the top and bottom edges of the gate, as shown in FIGS. 2 and 3. When the bus 10 stops and the door 12 is opened by the driver, the stop sign, gate and gate lock motors 13, 24, 34 are activated in the manner described above, causing the gate lock 30 to rotate in the unlocking direction and the gate arm 22 to extend to the deployed position. The gate lock 30 continues to rotate until the retaining finger 42 contacts the stop edge 33b of the stop 33. The gate arm 22 is then deployed until fully extended.

It can be seen in the preferred embodiment that the gate lock 30 does not need to be rotated fully 90° to release the gate arm 22. However, the hooked ends 42a, 44a of the fingers 42, 44 should engage the gate arm 22 with sufficient overlap that a slight rotation of the rotor 40 due to normal motion of the vehicle 10 will not release the gate arm 22 inadvertently.

Because the gate lock 30 must be moved to an unlocked state in order to release the gate arm 22, there is a slight delay in deploying the crossing gate 20. Where the safety device is used together with a stop sign safety device 12 or warning lights, the stop sign 12 and/or warning lights are activated first, with the gate lock 30, to warn oncoming motorists to stop. As the stop sign 12 is being deployed, the gate lock 30 is simultaneously moved to the unlocked state, then the gate arm 22 moved to the deployed position.

Much of the operation of the motor drive circuit 50 can be effected by a microprocessor-based circuit, as will be apparent to those skilled in the art, although this is likely to be a more costly alternative. In a microprocessor-based embodiment, as an additional safety precaution, at all times when the bus ignition is on but the gate 20 is not being deployed or retracted, the motor drive circuit can intermittently pulse the gate lock drive motor 34 to move the gate arm 22 in the retracting direction, in order to verify that the gate arm 22 is properly secured.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. An apparatus for operating a safety device comprising an arm having extended and retracted positions, comprising:
   a drive motor for moving the arm between the extended and retracted positions; and
   a lock for engaging the arm in the retracted position, comprising
      a rotor mounted in a path of retraction of the arm, having a locked position and an unlocked position, and comprising at least one retaining finger for engaging the arm in the locked position;
      a drive motor for rotating the rotor between the locked and unlocked positions; and
      a drive circuit for operating the arm drive motor and the rotor drive motor, comprising a circuit for sensing stalling of the rotor drive motor and deactivating the drive circuit in response thereto.

2. The apparatus of claim 1 wherein the at least one retaining finger comprises a hooked end adapted to engage the arm.

3. The apparatus of claim 2 wherein the rotor comprises two retaining fingers disposed in opposition.

4. The apparatus of claim 3 wherein the arm comprises bevelled upper and lower edges.

5. The apparatus of claim 2 wherein when the apparatus is in the retracted position the drive circuit periodically activates the rotor drive motor in a locking direction.

6. The apparatus of claim 1 wherein to extend the arm, the arm drive motor is activated after the rotor drive motor.

7. The apparatus of claim 1 wherein a stop is provided in a path of rotation of the rotor, whereby the rotor cannot rotate beyond the stop in an unlocking direction.

8. The apparatus of claim 7 wherein the stop comprises a slanted edge whereby the rotor can rotate beyond the stop in a locking direction.

9. An apparatus for operating a safety device comprising an arm having extended and retracted positions, comprising:
   a drive motor for moving the arm between the extended and retracted positions; and
   a lock for engaging the arm in the retracted position, comprising
      a rotor mounted in a path of retraction of the arm, having a locked position and an unlocked position, and comprising a pair of opposed retaining fingers for engaging the arm in the locked position, the retaining fingers having hooked ends for engaging over edges of the arm in the locked position, a distance between the hooked ends being greater than a height of the arm;
      a drive motor for rotating the rotor between the locked and unlocked positions; and
      a drive circuit for operating the arm drive motor and the rotor drive motor;
   whereby when the rotor is rotated to the unlocked position the arm can be extended through an opening between the hooked ends of the retaining fingers.

10. The apparatus of claim 9 wherein the at retaining fingers comprise hooked ends adapted to engage the arm.

11. The apparatus of claim 9 comprising a circuit for sensing stalling of the rotor drive motor and deactivating the drive circuit in response thereto.

12. The apparatus of claim 10 wherein the arm comprises bevelled upper and lower edges.

13. The apparatus of claim 10 wherein when the apparatus is in the retracted position the drive circuit periodically activates the rotor drive motor in a locking direction.

14. The apparatus of claim 9 wherein to extend the arm, the arm drive motor is activated after the rotor drive motor.

15. The apparatus of claim 9 wherein a stop is provided in a path of rotation of the rotor, whereby the rotor cannot rotate beyond the stop in an unlocking direction.

16. The apparatus of claim 7 wherein the stop comprises a slanted edge whereby the rotor can rotate beyond the stop in a locking direction.

17. A method of operating a safety device comprising an arm having extended and retracted positions, comprising the steps of:
   a. moving the arm from an extended position to a retracted position;
   b. rotating a rotor mounted in a path of retraction of the arm, the rotor having a locked position and an unlocked position and comprising at least one retaining finger for engaging the arm in the locked position; and c. sensing stalling of the rotor and deactivating the device in response thereto.

18. The method of claim 17 wherein the rotor comprises at least one retaining finger comprising a hooked end adapted to engage the arm and stall the rotor drive motor.

19. The method of claim 18 wherein the rotor comprises two retaining fingers disposed in opposition.

20. The method of claim 17 comprising the additional step of, when the apparatus is in the retracted position, periodically activating the rotor drive motor in a locking direction.

* * * * *